United States Patent
Perakes et al.

(10) Patent No.: US 8,992,365 B2
(45) Date of Patent: Mar. 31, 2015

(54) MECHANISM FOR ACTUATING A POWER TRANSFER UNIT

(71) Applicant: Ford Global Technologies, LLC, Dearborn, MI (US)

(72) Inventors: Andreas E. Perakes, Canton, MI (US); Matthew D. Hammond, Dearborn, MI (US); Laurence A. Deutsch, Farmington Hills, MI (US); Steven A. Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 13/780,024

(22) Filed: Feb. 28, 2013

(65) Prior Publication Data

US 2013/0178318 A1 Jul. 11, 2013

(51) Int. Cl.
*F16H 48/00* (2012.01)
*B60K 17/346* (2006.01)
*B60K 23/08* (2006.01)

(52) U.S. Cl.
CPC .............. *F16H 48/00* (2013.01); *B60K 17/346* (2013.01); *B60K 23/08* (2013.01)
USPC .......................................... 475/140; 475/220

(58) Field of Classification Search
CPC ......................................................... F16H 48/00
USPC .......... 475/86, 116, 140, 220; 192/69.8, 89.2, 192/89.27
See application file for complete search history.

(56) References Cited

U.S. PATENT DOCUMENTS

| | | | | |
|---|---|---|---|---|
| 2,195,479 | A | * | 4/1940 | Buchner ........................ 475/200 |
| 2,848,086 | A | * | 8/1958 | Warsaw ....................... 192/93 A |
| 4,792,010 | A | * | 12/1988 | Kitao et al. .................... 180/233 |
| 5,215,506 | A | * | 6/1993 | Hara ................................ 475/86 |
| 6,152,848 | A | | 11/2000 | Williams et al. |
| 6,726,591 | B2 | | 4/2004 | Maruyama et al. |
| 7,004,874 | B2 | | 2/2006 | Mizon et al. |
| 7,150,694 | B2 | | 12/2006 | Mizon et al. |
| 7,311,633 | B2 | | 12/2007 | Maruyama et al. |
| 8,702,553 | B2 | * | 4/2014 | Janson et al. .................. 475/220 |
| 2002/0061801 | A1 | | 5/2002 | Amanuma et al. |
| 2003/0024753 | A1 | | 2/2003 | Maruyama et al. |
| 2012/0015770 | A1 | * | 1/2012 | Perakes et al. ................... 475/86 |

* cited by examiner

*Primary Examiner* — Edwin A Young
(74) *Attorney, Agent, or Firm* — James Dottavio; MacMillan, Sobanski & Todd, LLC

(57) ABSTRACT

A drive system includes a differential for transmitting power between a power source and first axles; a clutch including a first member driveably connected to the power source and a second member secured to a power transfer shaft; and a servo including a cylinder connected to a pressure source, a piston displaceable in the cylinder for mutually disconnecting the first and second members and allowing mutual engagement of the first and second members.

19 Claims, 3 Drawing Sheets

US 8,992,365 B2

MECHANISM FOR ACTUATING A POWER TRANSFER UNIT

BACKGROUND OF THE INVENTION

1. Field of the Invention

This invention relates generally to a motor vehicle driveline, which in operation transmits power continually to a first wheel set and selectively to a second wheel set.

2. Description of the Prior Art

Power transfer unit (PTU) efficiency is a concern in all wheel drive (AWD) vehicles derived from front wheel drive vehicle platforms, partially due to kinematics dictated by the speed and torque of the transmission output. For example, an AWD powertrain typically reduces fuel economy by about five percent compared to a front wheel drive (FWD) powertrain.

Driveline disconnects are a well established fuel economy improvement method in rear wheel drive powertrains, but are absent from FWD products. A principal difference between FWD-based and RWD-based AWD products is the transfer case used on RWD-based products provides a convenient disconnect point. In FWD-based powertrains, the relatively small package space available for the power transfer unit makes implementation of driveline disconnects on FWD-based products very challenging.

A need exists in the automotive industry for a front disconnect located ahead of a power takeoff unit in order to optimize fuel efficiency of the powertrain by minimizing in FWD operation the number of rotating components when AWD is not selected. Preferably the package space required for the disconnect permits the PTU drive system to be located within the transaxle case.

SUMMARY OF THE INVENTION

A drive system includes a differential for transmitting power between a power source and first axles; a clutch including a first member driveably connected to the power source and a second member secured to a power transfer shaft; and a servo including a cylinder connected to a pressure source, a piston displaceable in the cylinder for mutually disconnecting the first and second members and allowing mutual engagement of the first and second members.

The drive system eliminates the need for various PTU disconnect components due to utilizing the existing hydraulic control system, thereby substantially reducing the total system cost and significantly increasing fuel economy.

The drive system produces an increase in fuel economy by locating the disconnect between the power source and the secondary wheel set ahead of the PTU bevel pinion and mating bevel gear.

The drive system can be located within the casing of a transaxle, thereby reducing the required package space.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
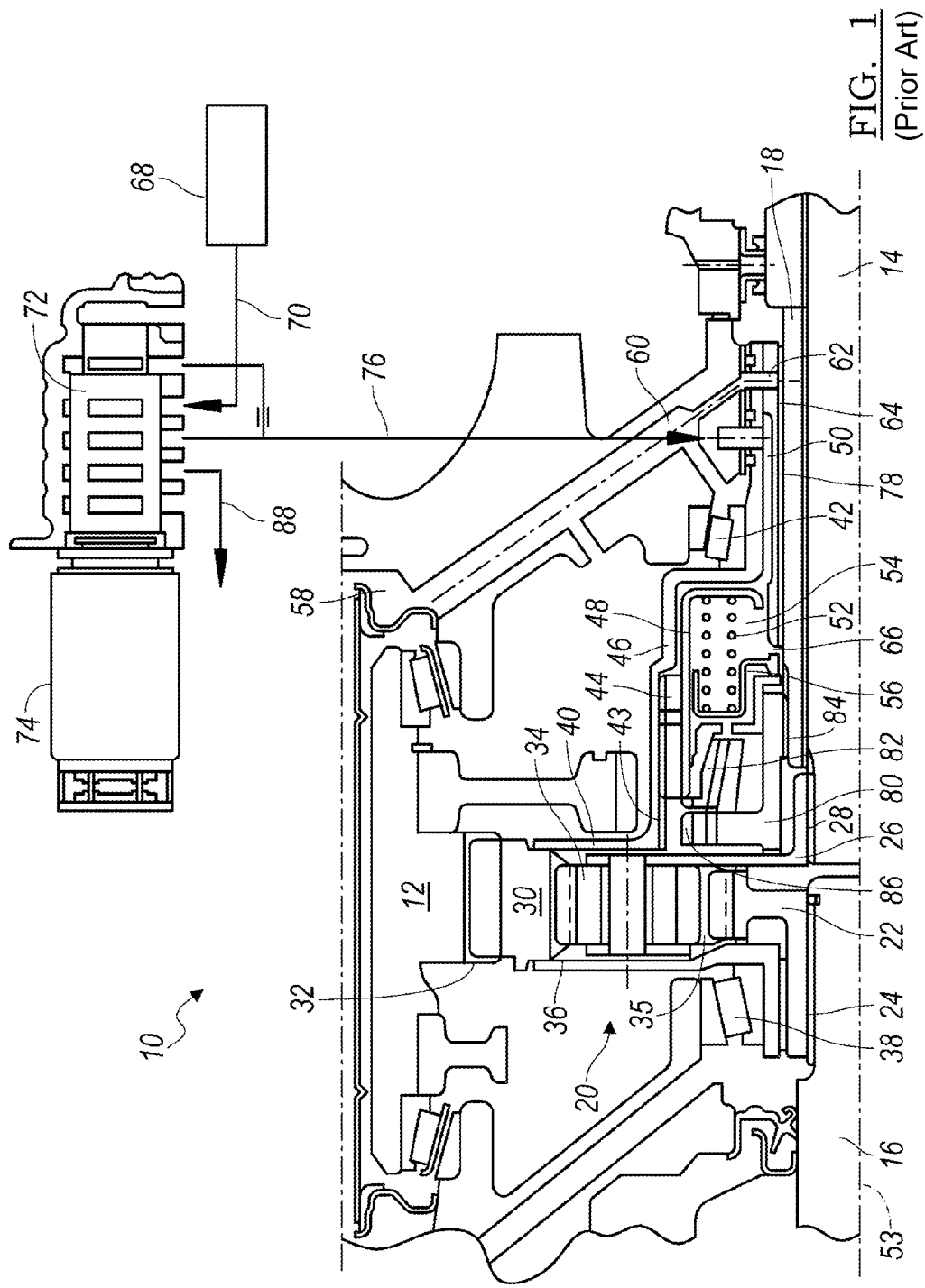
FIG. 1 is a cross section showing a drive system that connects a power source continually to a primary wheel set and selectively to a secondary wheel set.

FIG. 1 illustrates a drive system 10 that continually connects a power source to a primary wheel set, preferably the front wheels of a motor vehicle, and selectively connects the power source to a secondary wheel set, preferably the rear wheels. The power source is a transmission output shaft 12. Rotating power is transmitted to the wheels of the primary wheel set through a right-hand axle shaft 14 and a left-hand axle shaft 16. Power is selectively transmitted to the wheels of the secondary wheel set through a power transfer unit (PTU) input shaft 18.

A compound planetary differential 20 includes a sun gear 22, secured through a spline 24 to axle shaft 16; a carrier 26, secured through a spline 28 to axle shaft 14; a ring gear 30, engaged with a pinion 32 formed on the transmission output shaft 12; first planet pinions 34 supported on the carrier and meshing with the ring gear 30; and second planet pinions 35 supported on the carrier and meshing with the sun gear 22 and the first planet pinions 34. One side of ring gear 30 is secured to a disc 36 and supported at a bearing 38; the other side of ring gear 30 is secured to a disc 40 and supported at a bearing 42. Disc 40 is formed with an internal spline 43, which engages an external spline formed on a coupler sleeve 44.

Disc 40 forms a cylinder 46, which contains a piston 48, actuated by pressurized hydraulic fluid carried to cylinder 46 through a passage 50. A compression return spring 52 restores piston 48 to the disengaged position shown in the figure. Piston 48 is secured to coupler sleeve 44 such that they move along an axis 53 and rotate about axis 53 as a unit.

The volume 54 enclosed by piston 48 and spring retainer 56 forms a balance dam containing hydraulic fluid supplied from source of hydraulic lubricant 58 through a lube circuit, which includes passages 60, 62, 64, 66.

In operation, fluid from source of line pressure 68 is carried in passage 70 to a valve 72, which is controlled by a variable force solenoid 74. Valve 72 opens and closes a connection between line pressure source 68 and passages 76, 78, which carry piston-actuating pressure to cylinder 46 depending on the state of solenoid 74. When passages 76 and 78 are pressurized, piston 48 and coupler sleeve 44 move leftward, causing frictional contact at the conical surface between a member 80 and a synchronizing ring 82. Member 80 is rotatably secured by spline 84 to PTU input shaft 18. As the speed of member 80 is synchronized with the speed of ring gear 30, the internal spline of coupler sleeve 44 engages the dog teeth on synchronizing ring 82 and the clutch teeth 86 on the radial outer surface of connecting member 80, thereby driveably connecting ring gear 30 and PTU input shaft 18.

When passages 76 and 78 are vented through valve 72 and passage 88, piston 48 and sleeve 44 move rightward to their disengaged positions, causing connecting member 80 to disengage the ring gear 30, thereby disconnecting ring gear 30 from PTU input shaft 18.

Although the description refers to the speed of connecting member 80 being synchronized with the speed of ring gear 30 using a synchronizer, a connection between the ring gear and PTU input shaft 18 can be completed using a coupler instead of a synchronizer.

Figure 2:
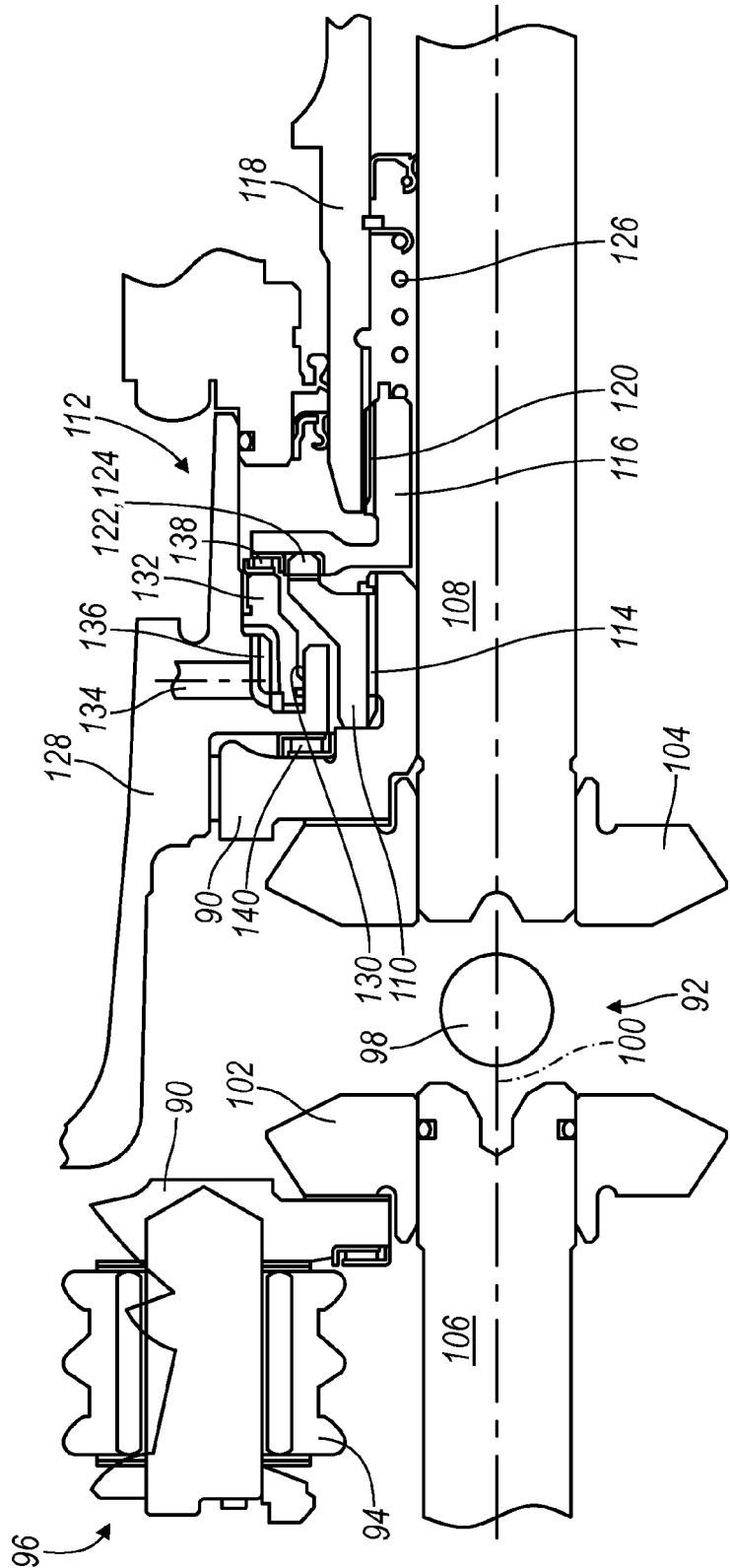
FIG. 2 is a cross section showing an alternate drive system that connects a power source continually to a primary wheel set and selectively to a secondary wheel set.

Referring now to FIG. 2, the housing 90 of an interwheel differential 92 is driveably connected to the final drive pinion 94 of an automatic transaxle 96. The differential's spindle 98, which rotates with the housing 90 about axis 100, carries bevel pinions (not shown), which mesh with side bevel gears 102, 104. The left-side bevel gear 102 is secured to a halfshaft 106, which extends to a driven axle shaft at the left-hand side of the vehicle. Similarly, the right-side bevel gear 104 is secured to a halfshaft 108, which extends to a driven axle shaft at the right-hand side of the vehicle.

Housing 90 is formed with an external spline, which meshes with an internal spline formed on a member 110 of dog clutch assembly 112. The mating splines form a spline connection 114 between housing 90 and clutch member 110.

A second member 116 of dog clutch assembly 112 is formed with an external spline, which meshes with an internal spline formed on a PTU shaft 118, coaxial with axis 100. The mating splines form a spline connection 120 between PTU shaft 118 and clutch member 116. PTU shaft 118 transmits torque to a drive shaft (not shown), which extends along a longitudinal axis of the vehicle to a rear differential, through which torque is transmitted to the rear wheels.

Dog clutch member 110 and dog clutch member 116 are formed with dog clutch teeth 122, 124, which are shown engaged mutually in FIG. 2, but can be disengaged when member 116 is moved rightward along axis 100 against the force of a compression spring 126, which continually biases member 116 leftward toward member 110.

The casing 128 of transaxle 96 is formed with a cylinder 130, containing an axially displaceable piston 132, and with a passage 134 for carrying hydraulic fluid under pressure to cylinder 130. Piston 132 is fixed against rotation by an axial spline connection 136 to casing 128. The spline connection 136 permits axial displacement of piston 132 relative to casing 128.

A thrust bearing 138 is fitted in an axial space between dog clutch member 116 and piston 132. A second thrust bearing 140 is fitted in an axial space between differential housing 90 and transaxle casing 128.

In operation, when cylinder 130 is pressurized through passage 134, piston 132 moves rightward and transmits axial force through bearing 138 to dog clutch member 116. That force causes member 116 to move rightward against return spring 126, thereby disengaging dog teeth 122, 124 and opening the drive connection between the tranaxle's final drive pinion 94 and PTU shaft 118.

When cylinder 130 is vented through passage 134, piston 132 moves leftward due to the force of spring 126 on dog clutch member 116, bearing 138, and piston 132. This leftward movement causes member 116 to move leftward, thereby engaging dog teeth 122, 124 and closing the drive connection between the tranaxle's final drive pinion 94 and PTU shaft 118. In this state the PTU shaft 118 transmits torque to the rear wheels.

Figure 3:
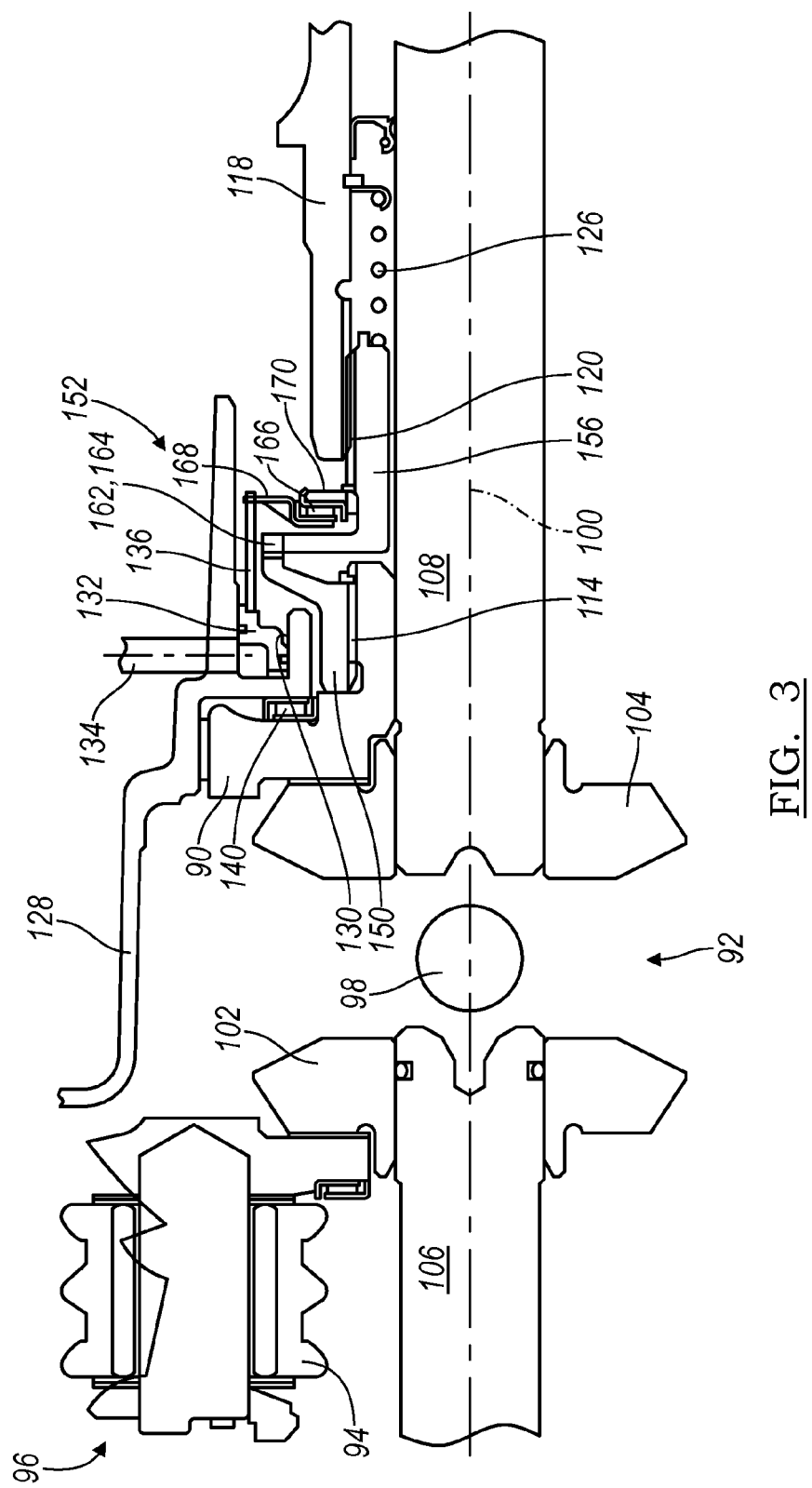
FIG. 3 is a cross section showing another arrangement of the drive system of FIG. 2.

FIG. 3 illustrates an assembly similar to that of FIG. 2, wherein housing 90 is formed with an external spline, which meshes with an internal spline formed on a member 150 of dog clutch assembly 152. The mating splines form a spline connection 114 between housing 90 and clutch member 150.

A second member 156 of dog clutch assembly 152 is formed with an external spline, which meshes with an internal spline formed on a PTU shaft 118, coaxial with axis 100. The mating splines form a spline connection 120 between PTU shaft 118 and clutch member 156. PTU shaft 118 transmits torque to a drive shaft (not shown), which extends along a longitudinal axis of the vehicle to a rear differential, through which torque is transmitted to the rear wheels.

Dog clutch member 150 and dog clutch member 156 are formed with dog clutch teeth 162, 164, which are shown engaged mutually in FIG. 3, but can be disengaged when member 156 is moved rightward along axis 100 against the force of compression spring 126, which continually biases member 156 leftward toward member 150. The dog teeth 162, 164 are located radially outward from thrust bearing 166.

The casing 128 of transaxle 96 is formed with a cylinder 130, containing axially displaceable piston 132, and with a passage 134 for carrying hydraulic fluid under pressure to cylinder 130. Piston 132 is fixed against rotation by friction between the piston seals and the cylinder 130.

Thrust bearing 166 is fitted in an axial space between a radial extension 168, which is secured to an end of piston 132, and a radial member 170, which is secured to dog clutch member 156. The second thrust bearing 140 is fitted in an axial space between differential housing 90 and transaxle casing 128.

In operation, when cylinder 130 is pressurized through passage 134, piston 132 moves rightward and transmits axial force through radial extension 168, bearing 166 and radial member 170 to dog clutch member 156. That force displaces member 156 rightward against the force of return spring 126, thereby disengaging dog teeth 162, 164 and opening the drive connection between the tranaxle's final drive pinion 94 and PTU shaft 118.

When cylinder 130 is vented through passage 134, piston 132 moves leftward due to the force of spring 126 applied to dog clutch member 156 and transmitted through radial member 170, bearing 166, and radial extension 168 to piston 132. This force of spring 126 displaces member 156 leftward, thereby engaging dog teeth 162, 164 and closing a drive connection between the tranaxle's final drive pinion 94 and PTU shaft 118. In this state the PTU shaft 118 transmits torque to the rear wheels.

Thrust bearing 166 of FIG. 3 is smaller than its counterpart bearing 138 of FIG. 2, thereby requiring a smaller space. The mating dog clutch teeth 162, 164 of FIG. 3 are located at a greater radial distance from axis 100 that the counterpart dog teeth 122, 124 of FIG. 2, thereby requiring a lower mating force between the clutch teeth 162, 164 for a unit of torque transmitted by the clutch assembly 152 as compared to the force between the clutch teeth 122, 124 of clutch assembly 112.

In accordance with the provisions of the patent statutes, the preferred embodiment has been described. However, it should be noted that the alternate embodiments can be practiced otherwise than as specifically illustrated and described.

The invention claimed is:

1. A drive system, comprising:
   a differential for transmitting power between a power source and first axles;
   a clutch including a first member driveably connected to the power source and a second member secured to a power transfer shaft;
   a servo including a cylinder connected to a pressure source, a piston displaceable in the cylinder for mutually disconnecting the first and second members and allowing mutual engagement of the first and second members; and
   wherein the piston is secured against rotation; and further comprising: a bearing for transferring displacement of the piston in a first direction to the second member and permitting rotation of the second member relative to the piston.

2. The drive system of claim 1, wherein the differential includes a housing that is secured to the first member.

3. The drive system of claim 1, further comprising a transmission casing that includes:
a spline connection to the piston whereby the piston is linearly displaceable and fixed against rotation; and
a passage that communicates hydraulically with the servo cylinder.

4. The drive system of claim 1, wherein the power transfer shaft is driveably connected to second axles.

5. The drive system of claim 1, wherein:
the first member includes first clutch teeth;
the second member includes second clutch teeth able to engage the first clutch teeth; and
a spring that continually biases the second member toward the first member such that the second clutch teeth engage the first clutch teeth.

6. The drive system of claim 5, wherein the spring applies a force to the second member, the force tending to engage clutch teeth on the second member with clutch teeth on the first member.

7. The drive system of claim 1, wherein:
the first member includes first clutch teeth;
the second member includes second clutch teeth able to engage the first clutch teeth; and
the bearing is located radially outward from an axis about which the second member rotates relative to a radial location of the clutch teeth.

8. A drive system, comprising:
a differential for transmitting power between a power source and first axles;
a cylinder connected to a pressure source;
a piston located in the cylinder and fixed against rotation;
a bearing;
a clutch actuated by the piston for transferring through the bearing a piston displacement that causes the power source and second axles to connect mutually and permits mutual connection of the power source and second axles.

9. The drive system of claim 8, wherein:
the clutch includes a first member driveably connected through a axially-directed spline to the power source and a second member driveably connected through a second axially-directed spline to a power transfer shaft; and
piston displacement disconnects the first and second members mutually and allows mutual engagement of the first and second members.

10. The drive system of claim 9, wherein the differential includes a housing that is secured to the first member.

11. The drive system of claim 9, wherein the power transfer shaft is driveably connected to the second axles.

12. The drive system of claim 9, wherein the bearing transfers piston displacement a first direction to the second member and permits rotation of the second member relative to the piston.

13. The drive system of claim 9, wherein:
the first member includes first clutch teeth;
the second member includes second clutch teeth able to engage the first clutch teeth; and further comprising:
the bearing for transferring displacement of the piston in a first direction to the second member and permitting rotation of the second member relative to the piston, the bearing located radially inward from an axis about which the second member rotates relative to a radial location of the clutch teeth.

14. The drive system of claim 9, wherein:
the first member includes first clutch teeth;
the second member includes second clutch teeth able to engage the first clutch teeth; and further comprising:
the bearing for transferring displacement of the piston in a first direction to the second member and permitting rotation of the second member relative to the piston, the bearing located radially outward from an axis about which the second member rotates relative to a radial location of the clutch teeth.

15. The drive system of claim 9, wherein:
the first member includes first clutch teeth;
the second member includes second clutch teeth able to engage the first clutch teeth; and
a spring that continually biases the second member toward the first member such that the second clutch teeth engage the first clutch teeth.

16. The drive system of claim 15, wherein the spring applies a force to the second member, the force tending to engage clutch teeth on the second member with clutch teeth on the first member.

17. The drive system of claim 8, further comprising a transmission casing that includes:
a spline connection to the piston whereby the piston is linearly displaceable and fixed against rotation; and
a passage that communicates hydraulically with the cylinder.

18. A drive system, comprising:
a differential for transmitting power between a power source and first axles;
a clutch including a first member driveably connected to the power source and a second member secured to a power transfer shaft;
a servo including a cylinder connected to a pressure source, a piston displaceable in the cylinder for mutually disconnecting the first and second members and allowing mutual engagement of the first and second members; and
wherein the first member includes first clutch teeth; the second member includes second clutch teeth able to engage the first clutch teeth; and
a spring that continually biases the second member toward the first member such that the second clutch teeth engage the first clutch teeth.

19. The drive system of claim 18, wherein the spring applies a force to the second member, the force tending to engage clutch teeth on the second member with clutch teeth on the first member.

\* \* \* \* \*